Patented Aug. 21, 1934

1,970,908

UNITED STATES PATENT OFFICE 1,970,908

SUBSTITUTED O-BENZOYL-BENZOIC ACID

Ivan Gubelmann, Wilmington, Del., Henry J. Weiland, South Milwaukee, Wis., and Hans Billroth Gottlieb, Chicago Heights, Ill., assignors to E. I. du Pont de Nemours & Company, Wilmington, Del., a corporation of Delaware No Drawing. Application December 1, 1933, Serial No. 700,616

6 Claims. (Cl. 260—64)

This invention relates to the preparation of new intermediates for anthraquinone vat dyestuffs and more particularly to the preparation of 2'-methyl-4'-chloro-5'-nitro-o-benzoyl-benzoic acid and 2'-methyl-4'-chloro-5'-amino-o-benzoyl-benzoic acid, having the following general formula

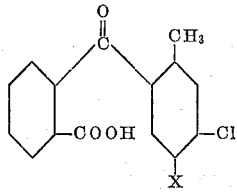

wherein X represents one of the following radicals, $NO_2$, $NH_2$.

It is an object of this invention to prepare the above mentioned compounds in a simple and economical manner, making them available as intermediate for the synthesis of valuable dyestuffs.

We have found that 2'-methyl-4'-chloro-o-benzoyl-benzoic acid can be nitrated with ease to 2'-methyl-4'-chloro-5'-nitro-o-benzoyl-benzoic acid by the use of suitable nitrating agents, such as a mixture of sulfuric and nitric acids. We have also found that this nitro compound can be reduced under certain conditions to give the 2'-methyl-4'-chloro-5'-amino-o-benzoyl-benzoic acid. Although this reduction may be carried out with various reducing agents such as electrolytic hydrogen, hydrogen and a catalyst, iron and hydrochloric acid, and the like, we prefer the use of iron and acetic acid.

To illustrate the preferred methods for carrying out these reactions, the following examples are given, in which parts by weight are used.

Example 1

274.5 parts of 2'-methyl-4'-chloro-o-benzoyl-benzoic acid are introduced into 550 parts of monohydrate and dissolved with stirring at a temperature of about 25° C. The solution is cooled to 10° C. and a mixture prepared from 340 parts of 25% oleum and 98 parts of mixed acid analyzing 72% nitric, 22% sulfuric, and 6% water, is added over a perior of about 2 hours, maintaining the temperature below 10° C. by the use of an ice bath. The nitration mass is stirred for an additional hour. The nitration mass is then slowly poured into ice water, whereby the product is precipitated. The mass is stirred for 12 hours and filtered, and the filter cake washed with water till practically free of mineral acid. The product is dried in vacuum at 100 C. Upon recrystallization from solvent naphtha, a satisfactory yield of 2'-methyl-4'-chloro-5'-nitro-o-benzoyl-benzoic acid is obtained, which has a melting point of 170° C. It is a white crystalline solid readily soluble in alcohol, ether and hot benzene.

Example 2

Into a flask equipped with a good agitator are charged 1200 parts of water, 500 parts of iron dust and 25 parts of acetic acid. This mixture is heated to 90–95° C. There is then charged into the above mixture a paste prepared from 319.5 parts of 2'-methyl-4'-chloro-5'-nitro-o-benzoyl-benzoic acid and 2000 parts of water, over the interval of 2 hours, maintaining a temperature of 95–98° C. during the reduction. This temperature is maintained for an additional hour. Soda ash is then added till the iron has been precipitated. The sludge is filtered off and washed with 1000 parts of hot water. The mother liquor and wash water are combined and run slowly into a mixture of ice and dilute hydrochloric acid. The product separates as a precipitate and is filtered off, washed with 500 parts of cold water and dried at 100° C. The yield of 2'-methyl-4'-chloro-5'-amino-o-benzoyl-benzoic acid is practically quantitative. It is a white crystalline solid, quite soluble in alcohol or glacial acetic acid. It can be readily crystallized from chloroform from which, after repeated crystallization, a product having a melting point of 156° C. was obtained.

The above examples have been given to illustrate a preferred method for producing these compounds and are not to be construed in any manner as limitations upon our invention for it will be obvious to those skilled in the art that various modifications may be made therein without departing from the spirit of our invention or the scope of the appended claims.

It is obvious that the nitro- or amino-2'-methyl-4'-chloro-o-benzoyl-benzoic acid may be converted to the metallic salts of the same by reacting with alkalis. The soda salt of the amino compound, for instance, is formed in Example 2 when the reduced compound is treated with soda ash.

What we claim is:

1. A compound which in the form of its free acid has the following general formula

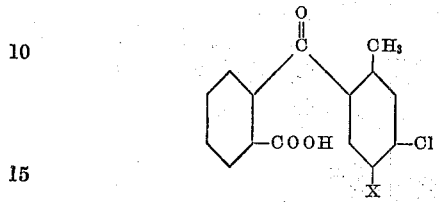

wherein X represents one of the radicals $NO_2$ and $NH_2$.

2. 2'-methyl-4'-chloro-5'-nitro-o-benzoyl-benzoic acid.

3. 2'-methyl-4'-chloro-5'-amino-o-benzoyl-benzoic acid.

4. In the process for preparing 2'-methyl-4'-chloro-5'-amino-o-benzoyl-benzoic acid, the steps which comprise mono-nitrating 2'-methyl-4'-chloro-o-benzoyl-benzoic acid and reducing the nitro compound so formed to the corresponding amine.

5. In the preparation of 2'-methyl-4'-chloro-5'-amino-o-benzoyl-benzoic acid, the steps which comprise mono-nitrating 2'-methyl-4'-chloro-o-benzoyl-benzoic acid with a mixture of sulfuric and nitric acids at a temperature below 10° C., isolating the product so formed, and subsequently reducing the same to the corresponding amine.

6. In the preparation of 2'-methyl-4'-chloro-5'-amino-o-benzoyl-benzoic acid, the steps which comprise reducing 2'-methyl-4'-chloro-5'-nitro-o-benzoyl-benzoic acid in acetic acid with iron at a temperature of 95–98° C. and isolating the amino compound so formed.

IVAN GUBELMANN.
HENRY J. WEILAND.
HANS BILLROTH GOTTLIEB.